United States Patent
Obaditch et al.

(10) Patent No.: US 9,457,423 B2
(45) Date of Patent: Oct. 4, 2016

(54) FRICTION STIR WELDING DEVICES AND METHODS FOR TANDEM TOOL AND ANVIL

(71) Applicant: FLUOR TECHNOLOGIES CORPORATION, Aliso Viejo, CA (US)

(72) Inventors: Christopher J. Obaditch, Corona del Mar, CA (US); Karly Moore, Aliso Viejo, CA (US); Gary Cannell, Richland, WA (US); Glenn Grant, Benton City, CA (US)

(73) Assignee: Fluor Corporation, Sugar Land, TX (US)

(*) Notice: Subject to any disclaimer, the term of this patent is extended or adjusted under 35 U.S.C. 154(b) by 33 days.

(21) Appl. No.: 14/203,023

(22) Filed: Mar. 10, 2014

(65) Prior Publication Data
US 2014/0299650 A1 Oct. 9, 2014

Related U.S. Application Data

(62) Division of application No. 13/757,211, filed on Feb. 1, 2013.

(51) Int. Cl.
*B23K 20/12* (2006.01)

(52) U.S. Cl.
CPC .......... *B23K 20/129* (2013.01); *B23K 20/126* (2013.01); *B23K 20/1245* (2013.01); *B23K 2201/10* (2013.01)

(58) Field of Classification Search
None
See application file for complete search history.

(56) References Cited

U.S. PATENT DOCUMENTS

| 5,205,048 | A | 4/1993 | Toomey et al. |
| 6,070,784 | A * | 6/2000 | Holt et al. ............ 228/112.1 |
| 6,419,142 | B1 | 7/2002 | Larsson |
| 7,614,109 | B2 | 11/2009 | Filippovitch |
| 7,832,613 | B2 * | 11/2010 | Hanlon et al. ............ 228/2.1 |
| 8,011,560 | B2 * | 9/2011 | Chen et al. ............ 228/112.1 |
| 8,056,797 | B2 | 11/2011 | Packer et al. |
| 2005/0035173 | A1 * | 2/2005 | Steel et al. ............ 228/2.1 |
| 2005/0139640 | A1 | 6/2005 | Kay |

FOREIGN PATENT DOCUMENTS

| EP | 1057575 | 12/2000 |
| EP | 1814686 | 7/2011 |
| GB | 2306366 | 5/1997 |

OTHER PUBLICATIONS

Fukuhara et al., "Development of a high-speed automatic welding process for simultaneous use on inside and outside surfaces of pipes", Welding International, vol. 11, Issue 7, 1997, p. 578-584.*
Mishra, R.S. et al., "Friction stir welding and processing", Materials Science and Engineering, 2005, vol. 50, pp. 1-78.

* cited by examiner

*Primary Examiner* — Devang R Patel
(74) *Attorney, Agent, or Firm* — Conley Rose, P.C.; Kristin Jordan Harkins

(57) ABSTRACT

Friction Stir Welding (FSW) devices and methods for simultaneously welding both sides of an arcuate joint are described. The FSW method includes the step of operating a FSW tool and an anvil on the exterior surface of the joint and simultaneously operating another FSW tool and anvil on the interior surface of the joint. The anvils are positioned in a juxtaposing manner to the FSW tools, and move in tandem with the FSW tools, thus providing a supporting force to the FSW tools during their operation.

20 Claims, 5 Drawing Sheets

FRICTION STIR WELDING DEVICES AND METHODS FOR TANDEM TOOL AND ANVIL

This application is a divisional application of U.S. patent application Ser. No. 13/757211, filed Feb. 1, 2013 entitled "Friction Stir Welding Devices and Methods using Tadem Tool and Anvil." This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTIVE SUBJECT MATTER

The field of the inventive subject matter is friction stir welding.

BACKGROUND

The background description includes information that may be useful in understanding the present inventive subject matter. It is not an admission that any of the information provided herein is prior art or relevant to the presently claimed inventive subject matter, or that any publication specifically or implicitly referenced is prior art.

Friction stir welding ("FSW") is a solid-state welding process in which a rotating tool (hereinafter a "FSW tool") heats and intermixes two workpieces at a seam. More specifically, the rotating tool has a pin and a shoulder that are pressed into the seam as the tool rotates, producing frictional heat between the tool and the workpieces. Enough heat is generated such that regions of the workpieces plasticize and mix. The shoulder of the FSW tool assists in causing the plasticized regions to intermix, thus joining (i.e., friction stir welding) the workpieces at the seam. The rotating FSW tool travels along the length of the seam to form a weld joint line between the two workpieces. A detailed description of the FSW process can be seen in Friction Stir Welding and Processing, by R. S. Mishra et al (Materials Science and Engineering R 50 (2005) 1-78).

FSW provides numerous advantages over other welding processes, in part, due to the fact that FSW occurs at much lower temperatures and without a filler material. Some of the advantages of FSW include: better mechanical properties at the weld; less porosity, shrinkage, and distortion; little or no toxic fume emissions; no consumable filler material; and ease of automation. However, there are still various problems associated with FSW, including exit holes, and the weight and costs associated with anvils or clamping tools, which are generally required to counteract the force from the FSW tool head.

Numerous methods and devices for friction stir welding are described in the patent literature. US Patent Application Publication No. 2005/0139640 to Kay, for example, describes friction stir welding methods that use multiple passes of the FSW tool. As another example, U.S. Pat. No. 8,056,797 to Packer et al. describes an expandable mandrel that enables multiple friction stir welding tool heads to simultaneously perform welding on the outer surface of a pipe.

All materials and references cited herein are incorporated by reference to the same extent as if each individual reference were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Of particular interest in the present application is the simultaneous welding of both sides of an arcuate joint, such as the joint formed by two pipe segments. U.S. Pat. No. 6,419,142 to Larsson describes a FSW device that has two opposing FSW tools (see Larsson FIGS. 5 and 6 and column 5, lines 35-62). However, as best understood by the applicant, it appears Larsson only contemplates simultaneous welding from one side of the joint (the additional welding head merely serves as a backing unit when placed opposite of the joint line with respect to the first welding; see Larsson column 6, lines 25-27). Larsson also fails to provide a friction stir welding device and method for simultaneously welding both sides of a joint at different locations along the joint.

Thus, there is still a need for improved friction stir welding devices and methods.

SUMMARY OF THE INVENTIVE SUBJECT MATTER

The inventive subject matter provides apparatus, systems, and methods in which both sides of an arcuate joint are simultaneously friction stir welded. The FSW process includes the steps of operating a first FSW tool and a first anvil on an exterior surface of the joint. The process also includes the step of simultaneously operating a second FSW tool and a second anvil on the interior surface of the joint while the first FSW tool and second anvil are still in operation. The first anvil and second anvil are positioned to provide a juxtaposing force to the second and first FSW tools, respectively. Each of the first FSW tool, second FSW tool, first anvil, and second anvil simultaneously move in tandem along the joint to produce a weld region within the joint.

The FSW process can optionally include the step of electronically monitoring and controlling the FSW process using various sensors and process rules and/or objectives.

In other aspects of some embodiments, the FSW process can include the step of traveling the second FSW tool and second anvil along tracks to a second arcuate joint once the first arcuate joint has been welded.

In yet other aspects of some embodiments, the FSW process can include the step of operating a finishing tool (e.g., cutting tool, milling tool, sander,) or a heating/cooling element along the interior surface of the joint and trailing the second FSW tool.

The inventive subject matter also provides FSW devices for welding the interior surface of an arcuate joint and for providing a supporting force that juxtaposes an external FSW tool operating on the exterior surface of the joint.

In one aspect of some embodiments, the FSW device comprises an anvil and a FSW tool coupled by an arm and/or frame. The FSW tool and anvil are operable from the inside surface of an arcuate joint and are configured to simultaneously travel along the joint line via a motor that drives the anvil. The FSW device may also include a second travel mechanism (e.g., a pipeline pig) that is configured to move the FSW device away from the first joint and to a second joint. In some embodiments, this travel mechanism comprises legs and wheels that engage tracks disposed on the interior surface of the workpieces (e.g., within a lumen of a pipe).

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 10b is a front view of the FSW device and travel mechanism of FIG. 10a.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

One should appreciate that the disclosed techniques provide many advantageous technical effects, including improved FSW devices for simultaneously welding opposite sides of an arcuate joint.

Figure 1:
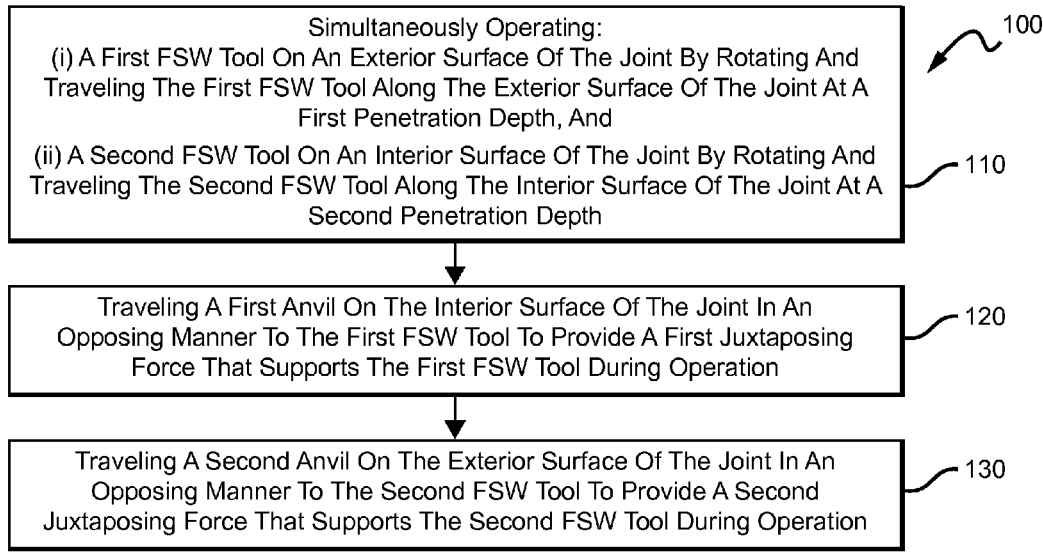
FIG. 1 is a method of simultaneously friction stir welding opposing sides of a joint.

FIG. 1 shows a method 100 for friction stir welding an arcuate joint, such as a joint that is formed by joining the ends of two pipe segments. In step 110, a first FSW tool (e.g., a tool having a pin and shoulder) is operated on the exterior surface of the joint while a second FSW tool is simultaneously operated on an interior surface of the joint. The FSW tools are operated by rotating the tools, penetrating the joint with the tool such that the joint is heated and material from the two workpieces (e.g., two pipe segments) is intermixed, and traveling the tool along the joint, thus forming a weld region along the length of the joint. The FSW tools are simultaneously operated at different locations along the joint, separated by an angular distance.

In step 120, a first anvil is disposed on the interior surface of the joint and opposite to the first FSW tool (i.e., at the same location on the joint as the first FSW tool but on the opposite side of the joint), and travels in tandem with the first FSW tool to provide support (e.g., a force) to the joint as the first FSW tool operates to produce a weld region. Similarly, in step 130, a second anvil is disposed on the exterior surface of the joint and opposite to the second FSW tool, and travels in tandem with the second FSW tool to provide support (e.g., a force) to the joint as the second FSW tool operates to produce a weld region.

During operation, the first FSW tool penetrates the exterior surface of the joint at a first penetration depth and the second FSW tool penetrates the interior surface of the joint at a second penetration depth. The first and second penetration depths can be equal to one another or different from one another. The penetration depths can be substantially fixed throughout the welding process or could vary depending on other process parameters. In some embodiments of method 100, the first and second penetration depths are both at least 50%, 60%, or even 80% of the thickness of the joint. In this manner, method 100 ensures that a weld region will be produced throughout the entire thickness of the joint and defects related to lack of penetration (LOP) are reduced or eliminated.

Figure 2:
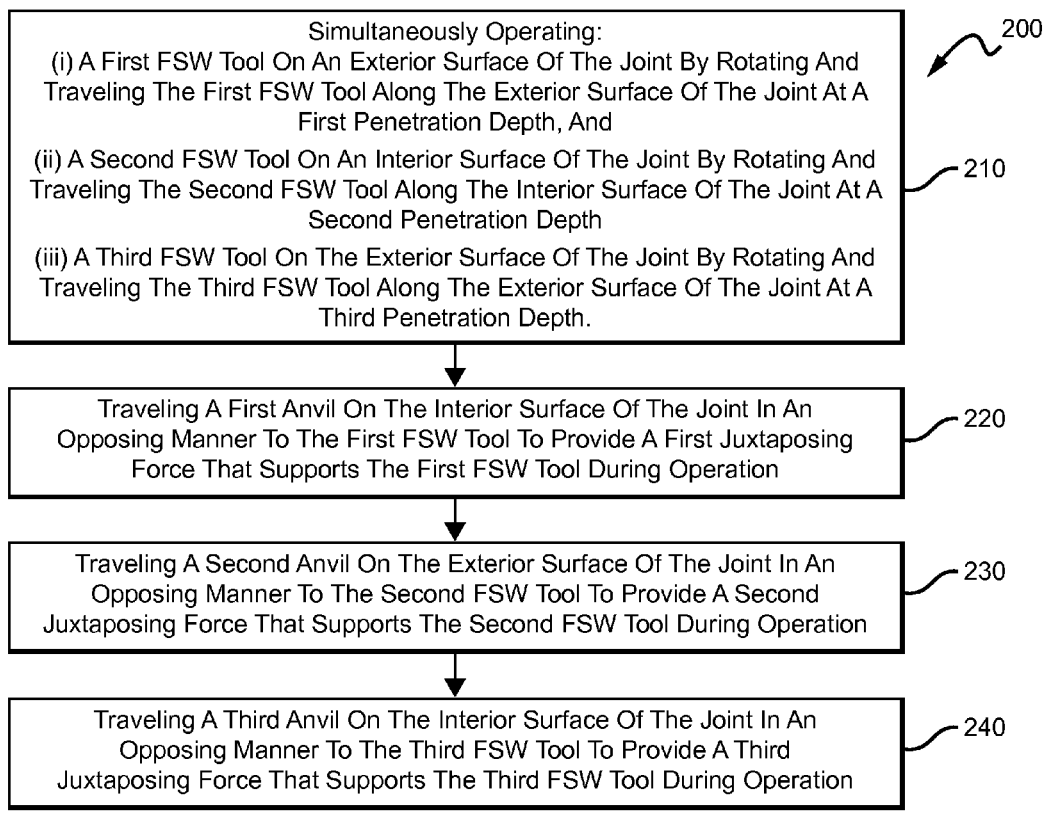
FIG. 2 is a method of simultaneously friction stir welding opposing sides of a joint using three FSW tools.

FIG. 2 shows a method 200 for friction stir welding an arcuate joint. Method 200 is similar to method 100, however, step 210 of method 200 includes the step of operating a third FSW tool on the exterior surface of the joint by rotating and traveling the third FSW tool along the exterior surface of the joint at a third penetration depth. Method 200 also includes step 240, which requires traveling a third anvil on the interior surface of the joint in an opposing manner to the third FSW tool to provide a third juxtaposing force that supports the third FSW tool during operation. Those of ordinary skill in the art will appreciate that additional FSW tools can be included in the methods described above without departing from the inventive concepts. Moreover, those of skill in the art will appreciate that tools other than FSW tools, such as cutters, buffers, milling tools, sanders, and heating elements, can be used simultaneously with FSW tools on an arcuate joint in the methods described above.

Figure 3:
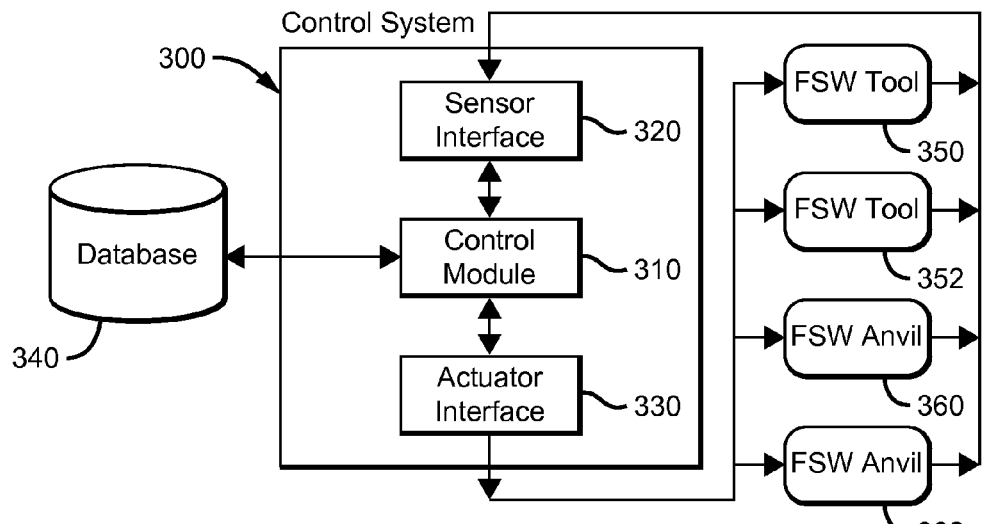
FIG. 3 is a schematic of a control system for controlling a FSW system that has two FSW tools and two anvils.

In some embodiments the FSW tools and anvils are controlled by a control system. FIG. 3 shows a schematic of a control system 300 for controlling process parameters of method 100. Examples of process parameters may include the rotational speed, travel speed, penetration depth, penetration force, and attack angle of the FSW tools. Other process parameters may include the travel speed and supporting forces of the anvils. Yet other process parameters may include the travel speed and temperature of heating/cooling elements placed at or near the joint. The process parameters mentioned above are provided merely for illustrative purposes and are not intended to limit the scope of the inventive subject matter.

Control system 300 includes a control module 310. Control module 310 is a set of electronically executable instructions configured to perform various functions. The instructions can be stored as instruction data objects on database 340 (e.g., a non-transitory electronic storage medium). A computing processor (not shown) can be used to access the instruction data objects and electronically execute the instructions. Control system 300 also includes a sensor interface 320, which is configured to receive sensor signals from FSW tool 350, FSW tool 352, FSW anvil 360, and FSW anvil 362. Sensor interface 320 communicates the signals to control module 310, which is configured to store the sensor signals as sensor data objects on database 340. Control module 310 could also receive sensor signals from other devices, such as heating/cooling elements or cutters, buffers, and other finishing tools.

Control module 310 is configured to compare sensor signals with predetermined rules to determine a recommendation for changing process parameters. The predetermined rules are stored on database 340 as rule objects. Examples of predetermined rules may include a desired heating/cooling profile for the welded joint (e.g., length of time at a specific temperature, rate of temperature change), a desired penetration depth for the FSW tools, a desired penetration force, or even a prioritized list of desirable controlled parameters, each parameter having a weighted value.

The recommendation may be presented to a user such as a weld technician via a user interface, such as a print-out, audio signal, or visual display (not shown). The user could then choose to implement the recommendation, in which case control module 310 sends a control signal to at least one of FSW tool 350, FSW tool 352, FSW anvil 360, and FSW anvil 362 via actuator interface 330. Control module 310 could also be configured to automatically send the control signal without user interaction. When the control signal is received by one of the devices, a process control is changed via an actuator (e.g., motor, hydraulic system, heating/cooling element, etc.). It should be appreciated that FSW tool 350, FSW tool 352, FSW anvil 360, and FSW anvil 362 may refer broadly to subsystems having numerous components that relate to FSW processes, such as sensors, actuators, FSW tools, and anvils. Each of FSW tool 350, FSW tool 352, FSW anvil 360, and FSW anvil 362 could comprise an individual subsystem having a local control system.

Control systems for FSW devices are also described in co-owned U.S. patent application Ser. No. 13/677586 (the '586 application), filed on Nov. 15, 2012, which is incorporated herein by reference. Those of ordinary skill in the art will appreciate that many of the inventive concepts described in the '586 application can be implemented in control system 300.

Figure 4A:
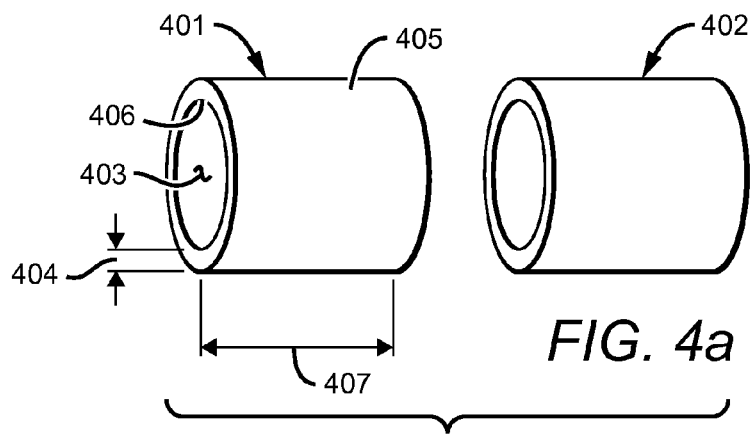
FIGS. 4a and 4b show a joint formed between the ends of two pipe segments.

FIG. 4a shows a first pipe segment 401 and a second pipe segment 402. Pipe segment 401 has a hollow interior 403 (e.g., a lumen), a wall thickness 404 defined by an inner diameter and an outer diameter, an exterior surface 405, an interior surface 406, and a length 407. Pipe segment 402 also has a hollow interior, a wall thickness, exterior and interior surfaces, and a length, although not necessarily the same size as pipe segment 401. The exact size, dimension, composition and general configuration of pipe segments 401 and 402 can vary, depending on the particular application. Any configuration suitable for friction stir welding is contemplated.

Figure 4B:
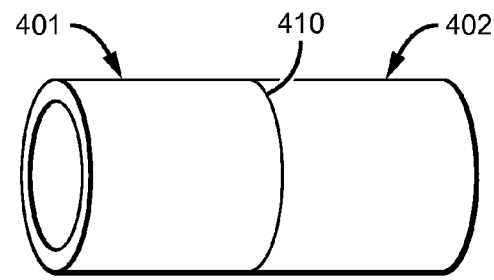

When the ends of pipe segments 401 and 402 are joined, as shown in FIG. 4b, they form a continuous hollow interior and an arcuate joint 410. When joint 410 is welded, pipe segments 401 and 402 can be used in combination with other components to transport gas, water, sewage, or any fluid. Pipe segments 401 and 402 can also be used to store or contain matter.

In some embodiments, the average thickness of pipe segment 401 is substantially equal to the average thickness of second pipe segment 402. For pipe segments having large outer diameters (e.g., 4 feet, 6 feet, or even greater than 10 feet), manufacturing processes often result in pipe segments having a substantial variation in thickness. In some embodiments, the FSW methods and systems described herein provide a FSW tool penetration depth that is significantly larger than the variation in the wall thickness of the pipe segments. For example, the first and second pipe segment could have a variation in wall thickness that is less than 20%, 10%, or even 5% of the lesser of the first penetration depth (i.e., the penetration depth of the first FSW tool) and the second penetration depth (i.e., the penetration depth of the second FSW tool).

In some applications the first and second penetration depths are at least ¾ inches, and in some cases, at least 1½ inches. In addition, first and second penetrations depths can start at ¾ inches and gradually increase to 1 inch or more.

In other aspects of some embodiments, the first pipe segment and the second pipe segment each have a wall thickness of at least 3 inches. In such embodiments, the penetration depths of the FSW tools are preferably at least 50% of the wall thickness (e.g., at least 1 and ½ inches) and the variation in wall thickness is less than 1% of the penetration depth (e.g., 0.015 inches). However, these values are provided primarily for illustrative purposes and those of skill in the art will appreciate that the inventive concepts described herein can be applied to arcuate joints of various wall thicknesses and having various degrees of thickness variation.

Figure 4C:
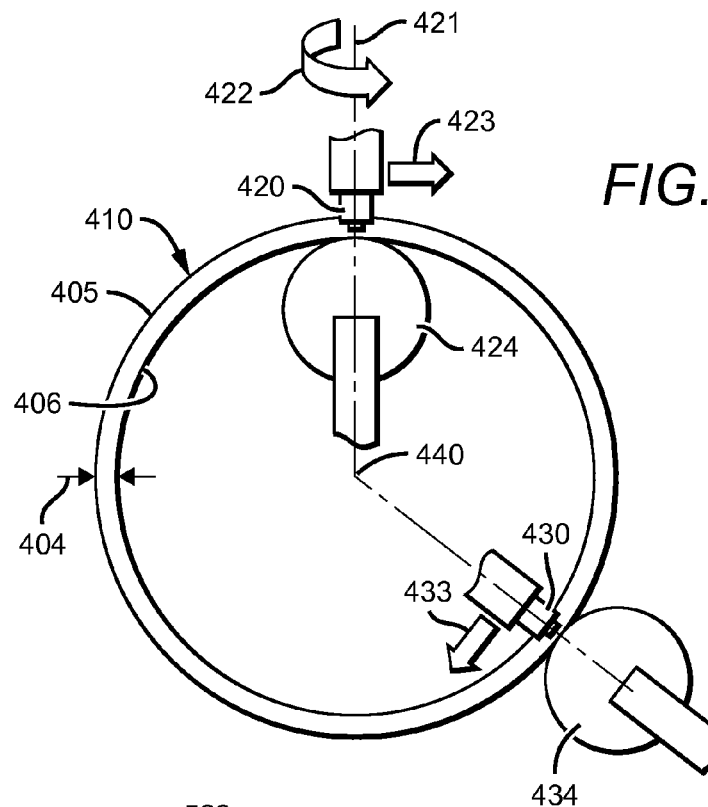
FIG. 4c is a cross sectional view of the joint of FIGS. 4a and 4b being friction stir welded according to the method of FIG. 1.

FIG. 4c shows a cross sectional view of arcuate joint 410 being friction stir welded according to method 100. FSW tool 420 operates on exterior surface 405 to produce a FSW weldment on arcuate joint 410. FSW tool 420 rotates about an axis 421 as shown by arrow 422, and travels along joint 410 in the direction shown by arrow 423 (e.g., clockwise). Anvil 424 simultaneously travels with FSW tool 420 and provides a juxtaposing force on interior surface 406.

Figure 5:
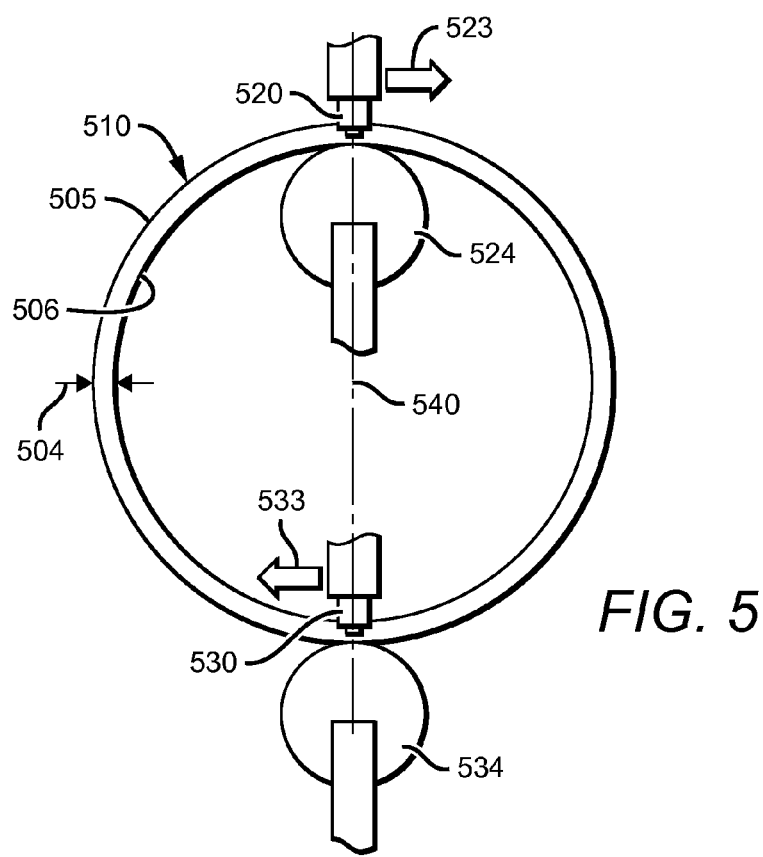
FIG. 5 is a cross sectional view of another example of the joint of FIGS. 4a and 4b being friction stir welded according to the method of FIG. 1.

In addition, FSW tool 430 rotates and travels in direction 433 on interior surface 406 while anvil 434 travels with FSW tool 430 and provides a juxtaposing force on exterior surface 405. FSW tool 420 and FSW tool 430 are angularly separated from one another by angle 440. FIG. 4c shows angle 440 at about 135 degrees. However, FSW tool 420 and FSW tool 430 could be separated by any degree suitable for the particular application. In some embodiments, angle 440 is set at only several degrees, whereas in other embodiments, angle 440 is set at a maximum angular distance of 180 degrees, as is shown in FIG. 5. It is also contemplated that angle 440 could vary throughout the process (e.g., the travel speeds of FSW tool 420 and FSW tool 430 could be set at different constant speeds or could be set at different accelerations and/or decelerations).

In FIG. 4c, FSW tool 430 is in front of FSW tool 420 and is the "leading" tool. In other embodiments, FSW tool 420 can be set as the leading tool, with FSW tool 430 "trailing" behind.

In other aspects, FSW tool 420 and FSW tool 430 could travel across the entire length of arcuate joint 410 (i.e., a full 360 degrees) or only a portion of joint 410 (e.g., 180 degrees). In some embodiments of method 100, however, at least a portion of the operation time of FSW tool 420 temporally overlaps with the operation time of FSW tool 430 (e.g., they are operated simultaneously for at least some time) in order to reduce the overall time required to complete the weld.

In some applications, FSW tool 420 and FSW tool 430 could be operated in a substantially non-staggered configuration (e.g., angle 440 is 0, or only a few degrees) thus eliminating the need for anvil 424 and 434. In this application, each of FSW tool 420 and FSW tool 430 provide a juxtaposing force for one another during the welding process. However, when FSW tool 420 and FSW tool 430 are directly juxtaposing (i.e., angle 440 is substantially 0) the combined depth of penetration of FSW tool 420 and FSW tool 430 will not be able to exceed wall thickness 404 without coming into contact with one another. Staggering FSW tool 420 and FSW tool 430 by an angular distance thus allows for a greater combined penetration depth to ensure a complete weld region throughout wall thickness 404. Moreover, the greater penetration depth allows for FSW processes to be implemented on arcuate joints having larger wall thicknesses.

In applications that demand high weld quality along the entire length of joint 410, FSW tool 420 and FSW tool 430 can each travel the entire length of joint 410 to ensure that a weld region is formed throughout the entire wall thickness 404 of joint 410.

Figure 6:
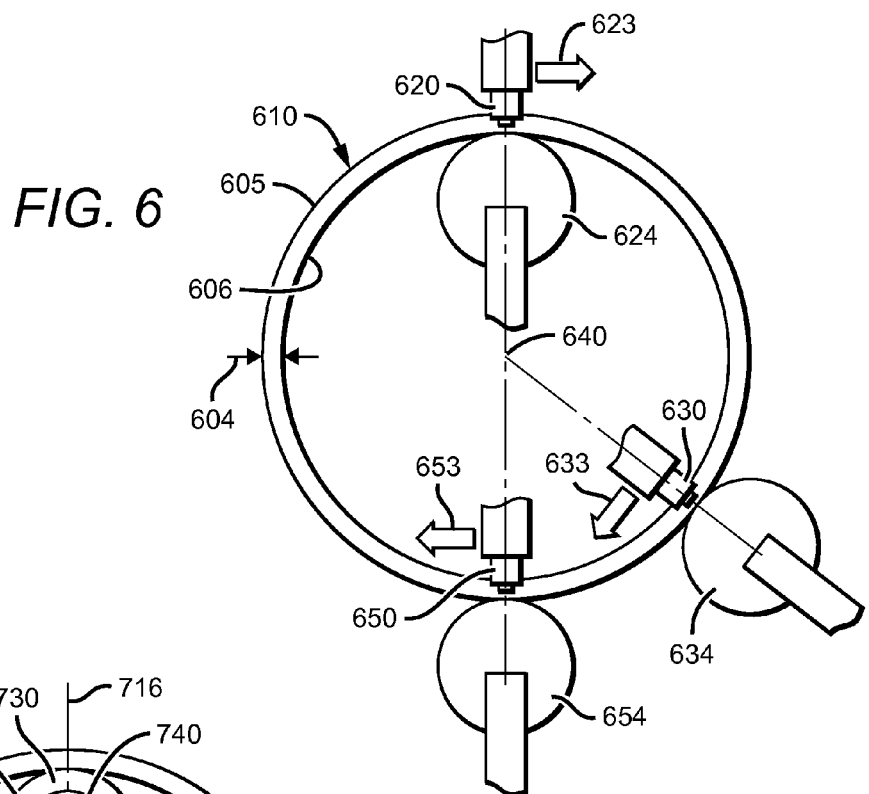
FIG. 6 is a cross sectional view of the joint of FIGS. 4a and 4b being friction stir welded according to the method of FIG. 2.

FIG. 6 illustrates a variation of method 200. FSW tool 620 is operated on exterior surface 605 of arcuate joint 610 and travels in the direction of arrow 623. Anvil 624 operates on interior surface 606 and simultaneously travels in the direction of arrow 623 to provide a juxtaposing force for FSW tool 620. In addition, FSW tool 630 operates with anvil 634 in a manner similar to previously described with respect to FIG. 4c (e.g., FSW tool 430 and anvil 434). FSW tool 630 is angularly separated from FSW tool 620 by angle 640.

The method shown in FIG. 6 also includes a FSW tool 650 that operates on interior surface 606 and is juxtaposed by anvil 654. Whereas method 200 requires a third FSW tool that operates on the exterior surface of an arcuate joint, the method illustrated by FIG. 6 shows a third FSW tool (e.g., FSW tool 650) that operates on the interior surface of an arcuate joint. Those of ordinary skill in the art will appreciate that additional FSW tools and other tools (e.g., cutter, sander, heating/cooling element) can be simultaneously operated on the interior and exterior surfaces of an arcuate joint, as permitted by space, power, and other constraints.

Figure 7:
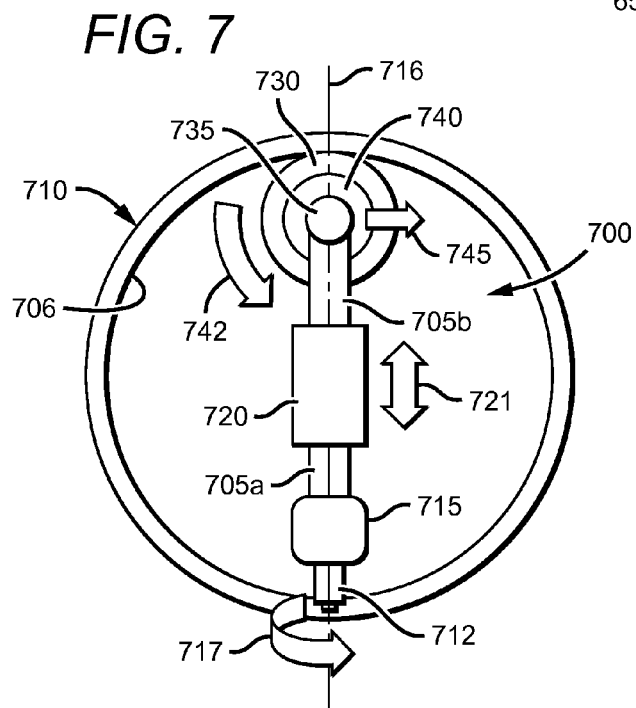
FIG. 7 is a side view of a FSW device for welding an interior surface of a pipe and for supporting an exterior FSW device.

FIG. 7 shows a FSW device 700 that operates on an interior surface 706 of an arcuate joint 710. Device 700 includes an arm 705a. At the end of arm 705a is a FSW tool 712 that is gripped by, and removably coupled with, a head 715. Head 715 rotates FSW tool 712 with respect to arm 705a about axis 716 as illustrated by arrow 717. Head 715 can further include various sensors (e.g., force transducer, potentiometer, accelerometer, etc.) to measure parameters relevant to the FSW process (e.g., penetration depth, angular position, rotational speed, temperature, etc.).

Device 700 also includes an arm 705b. At the end of arm 705b is anvil 730. Anvil 730 is rotatably coupled with arm 705b at coupling 735 and is driven by a motor 740. Coupling 735 can comprise a bearing joint, or any other rotatable coupling suitable for allowing anvil 730 to rotate with respect to arm 705b. When driven by motor 740, anvil 730 rotates in the direction shown by arrow 742 and travels forward in direction 745.

Arm 705a and arm 705b are coupled via hydraulic press 720. Press 720 is configured to expand between arm 705a and 705b as shown by arrow 721. Press 720 produces a first force on interior surface 706 via FSW tool 712 and a second force on interior surface 706 via anvil 730. Device 700 provides a means to simultaneously weld interior surface 706 of joint 710 at one location while providing a supporting force to an external FSW tool at another location on joint 710.

Figure 8:
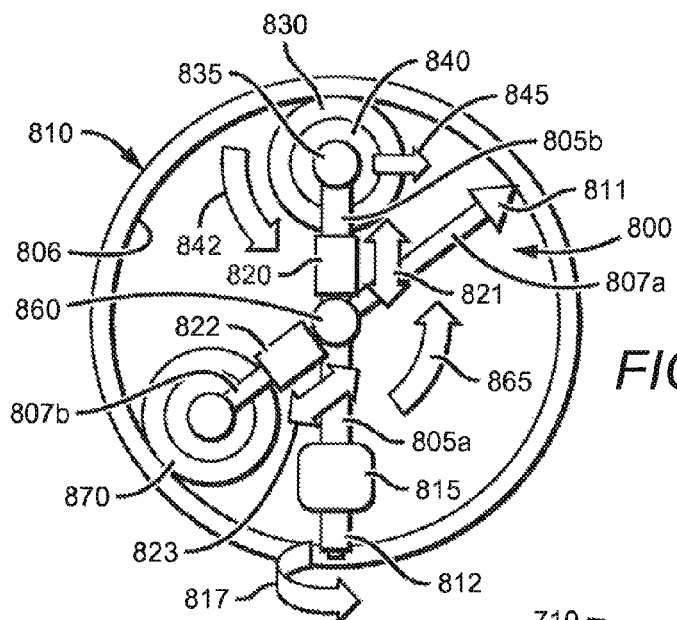
FIG. 8 is a side view of another FSW device for welding an interior surface of a pipe and for supporting an external FSW device.

FIG. 8 shows a device 800 that operates on an interior surface 806 of an arcuate joint 810. Device 800 includes an arm 805a indirectly coupled with an arm 805b via a hydraulic press 820. At the end of arm 805a is a FSW tool 812, which is removably and rotatably held by a head 815. Head 815 rotates FSW tool 812 during operation of device 800, as shown by arrow 817, to produce a FSW weldment region within arcuate joint 810.

Device 800 also includes an arm 805b. At the end of arm 805b is anvil 830. Anvil 830 is rotatably coupled with arm 805b at coupling 835 and is driven by a motor 840. Coupling 835 can comprise a bearing joint, or any other rotatable coupling suitable for allowing anvil 830 to rotate with respect to arm 805b. When driven by motor 840, anvil 830 rotates in the direction shown by arrow 842 and travels forward in direction 845.

Press 820 is configured to expand between arm 805a and 805b as shown by arrow 821. Press 820 produces a first force on interior surface 806 via FSW tool 812 and a second force on interior surface 806 via anvil 830.

In addition, device 800 includes an arm 807a indirectly coupled with an arm 807b via a hydraulic press 822. Arm 807b and press 822 are similar in structure to arm 805b and press 820, respectively, and operate in a similar manner. Arm 807a, however, is unlike arm 805a in that it has a cutting tool 811 at its end rather than a FSW tool. Cutting tool 811 operates on interior surface 806 to provide a finishing cut after FSW tool 812 creates a weld region.

Arm 805a and arm 807a are coupled via coupling 860 and form an angle 865. Coupling 860 can be a rigid coupling, in which angle 865 remains constant while device 800 is operated. Coupling 860 could also comprise a rotatable coupling, thus allowing arm 805a to rotate with respect to arm 807a (e.g., before, during, and/or after operation of device 800). In such embodiments, angle 865 can be adjusted and controlled during the FSW process.

Each pair of arms independently produces two forces on interior surface 806. The pairs of forces can be independently controlled by hydraulic press 820 and 822. In some embodiments, device 800 can further include sensors for sensing various parameters and characteristics relevant to the FSW process. Moreover, the controllable parameters of device 800 (e.g., forces, travel speeds, rotational speeds, penetration depths, positions of components, etc.) can be coupled with a control system (e.g., feedback loop) and adjusted during the FSW process to produce a weld having a desired temperature heating/cooling profile and/or a desired penetration depth.

Devices 700 and 800 can be simultaneously used with other (external) FSW devices that operate on the exterior surface of an arcuate joint. The position of anvil 730, 830, and/or 870 can be controlled and synchronized with the external FSW devices to provide a force that juxtaposes and supports FSW tools (or other tools) of the external devices.

Figure 9:
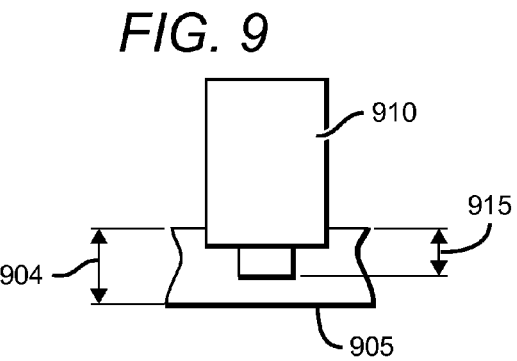
FIG. 9 is a close-up view of a FSW tool penetrating a joint.

FIG. 9 shows a close-up view of a FSW tool 910 penetrating a joint 905 at a penetration depth 915. Penetration depth 915 is more than 50% of wall thickness 904 of joint 905. In some embodiments, the methods and systems described above can utilize a FSW tool penetration depth that is more than 50%, 60%, or even 80% of the thickness of the joint to be welded. Simultaneously operating two or more FSW tools from opposite sides of a joint (e.g., interior and exterior) at deep penetration depths (e.g., more than 50% of the thickness of the joint) can reduce both (i) the time to complete the weld and (ii) the likelihood of lack of penetration (LOP) defects. In addition, the FSW methods and systems described herein allows for welding of arcuate joints having greater thicknesses.

Figure 10A:
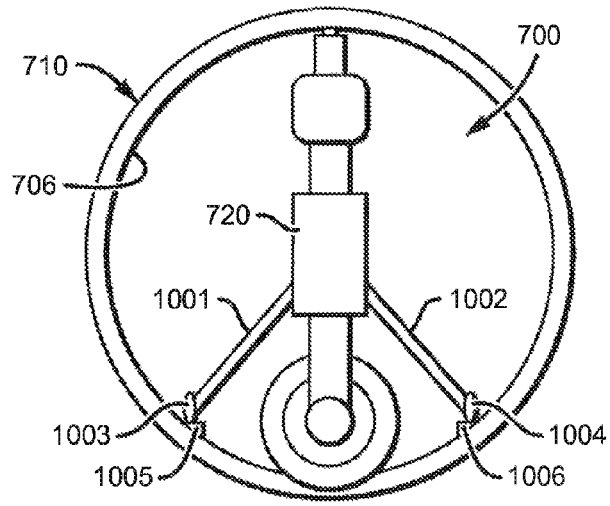
FIG. 10a is a side view of a FSW device and a travel mechanism.

FIG. 10a shows a side view of a FSW device 700 adapted with a travel mechanism (e.g., pipeline pig) for traveling down a length of the pipe segments that form joint 710. The travel mechanism includes four legs, only two of which can be seen from the side perspective view in FIG. 10a (e.g., legs 1001 and 1002). Each of the legs has a wheel (e.g., wheels 1003 and 1004) that fit in tracks 1005 and 1006. Tracks 1005 and 1006 are removably placed within the lumen and along the length of the pipe segments that form joint 710.

Once device 700 is properly located along the length of the pipe segments at joint 710, the legs of the travel mechanism are retracted via hydraulic press 720, thus allowing device 700 to annularly rotate within the pipe segments. When welding of joint 710 is complete, device 700 can then be transferred to a new joint further down the length of the pipe segments by extending the legs and wheels of the travel mechanism to engage tracks 1005 and 1006, and then traveling device 700 along tracks 1005 and 1006 (see arrow 1010 in FIG. 10*b*). Device 700 can be pushed or pulled manually, by using a motor coupled with the wheels of the travel mechanism, or using any other mechanism suitable for moving the weight of device 700.

Figure 10B:
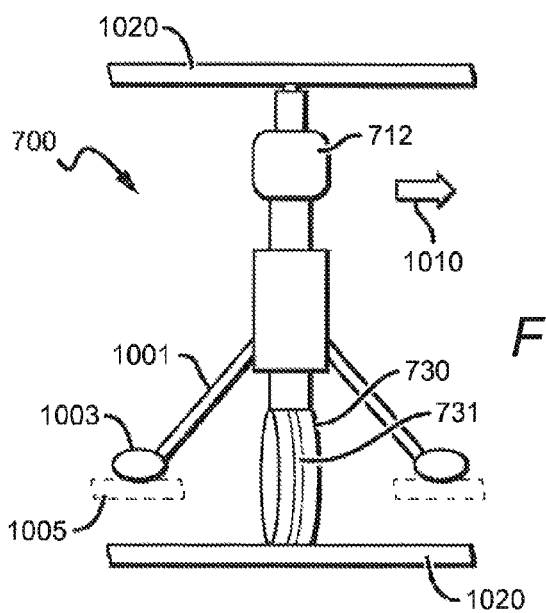

FIG. 10*b* shows a front view of device 700 adapted with the travel mechanism. This perspective illustrates how the legs of the travel mechanism are angled outward such that a track segment between the legs (and in the rotational path of FSW tool 712 and anvil 730) can be removed to allow device 700 to rotate during the welding process.

The front view of FIG. 10*b* also shows the surface of anvil 730 that comes into rotational contact with interior surface 706 of joint 710. This surface of anvil 730 can include a sacrificial material 731, as described in co-owned U.S. patent application Ser. No. 13/683126 filed on Nov. 21, 2012, which is incorporated herein by reference.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

While the examples above primarily focus on welding arcuate joints, those of ordinary skill in the art will appreciate that many of the inventive concepts described herein can be similarly applied to flat joints, irregularly-curved joints, and other joint configurations.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C and N, the text should be interpreted as requiring only one element from the group, not A plus N, or B plus N, etc.

What is claimed is:

1. A friction stir welding system for simultaneously welding an exterior surface and an interior surface of an arcuate joint formed by a first pipe segment and a second pipe segment, comprising:
    a first FSW tool configured to rotate and travel along the exterior surface of the joint at a first penetration depth;
    a second FSW tool configured to rotate and travel along the interior surface of the joint at a second penetration depth and at the same time that the first FSW tool travels along the exterior surface of the joint;
    a first anvil configured to travel along the interior surface of the joint in a juxtaposing manner with the first FSW tool to provide a first opposing force;
    a second anvil configured to travel along the exterior surface of the joint in a juxtaposing manner with the second FSW tool to provide a second opposing force; and
    a control engine comprising a processor and an electronic storage medium having executable code configured to monitor and control simultaneous operation of the first FSW tool, second FSW tool, first anvil, and second anvil,
    wherein the first anvil is rotatably coupled with a first arm through a coupling and the second FSW tool is rotatably coupled with a second arm through a head,
    wherein the first and second arms are coupled via press.

2. The friction stir welding system of claim 1, further comprising at least one sensor for sensing a location of at least one of the first FSW tool, second FSW tool, first anvil, and second anvil, and for generating a signal that is provided to the control engine.

3. The friction stir welding system of claim 1, further comprising at least one sensor for sensing at least one of rotation, travel speed, penetration force, and penetration depth of the first FSW tool and second FSW tool.

4. The friction stir welding system of claim 1 further comprising:
    a first travel mechanism that moves the first anvil and the first FSW tool along a length of a lumen of the first and second pipe segments; and a second travel mechanism that simultaneously moves the second anvil and the second FSW tool in tandem along the joint of the first pipe segment and the second pipe segment.

5. The friction stir welding system of claim 1, further comprising a third tool coupled with a third anvil and operable from a third interior surface of the joint.

6. The friction stir welding system of claim 5, wherein the third tool is selected from the group consisting of a FSW tool, a cutter, and a milling tool.

7. The friction stir welding system of claim 1, wherein the first anvil includes a sacrificial material removably coupled with the first anvil and configured to form part of the weld when penetrated by the first FSW tool.

8. The friction stir welding system of claim 1, further comprising a sensor operable to lead at least one of the first FSW tool, the second FSW tool, the first anvil, the second anvil.

9. The friction stir welding system of claim 1, further comprising a sensor operable to trail at least one of the first FSW tool, the second FSW tool, the first anvil, and the second anvil.

10. The friction stir welding system of claim 9, wherein the sensor is configured to track translative movement of the second FSW tool.

11. The friction stir welding system of claim 9, wherein the sensor is configured to determine a depth to which a rotatable pin of the second FSW tool is disposed within a wall of the joint.

12. The friction stir welding system of claim 1, wherein the first FSW tool and second FSW tool are offset by 180 degrees.

13. The friction stir welding system of claim 1, wherein the first anvil is coupled with a drive motor.

14. The friction stir welding system of claim 1, wherein the press is a hydraulic press.

15. The friction stir welding system of claim 1, wherein the coupling is a bearing joint.

16. The friction stir welding system of claim 1, wherein the head rotates the second FSW tool with respect to the second arm.

17. The friction stir welding system of claim 1, wherein the head includes at least one sensor to measure one or more of a penetration depth, angular position, rotational speed, and temperature of the second FSW tool.

18. The friction stir welding system of claim 4, further comprising:
    tracks removably placed in the lumen of the first and second pipe segments, wherein the first travel mechanism comprises four legs, each of the four legs having a wheel that fits in the tracks.

19. The friction stir welding system of claim 18, wherein the second travel mechanism comprises four legs, each of the four legs of the second travel mechanism having a wheel that fits in the tracks.

20. The friction stir welding system of claim 18, wherein the press is connected to the legs of the first travel mechanism.

* * * * *

UNITED STATES PATENT AND TRADEMARK OFFICE
CERTIFICATE OF CORRECTION

PATENT NO. : 9,457,423 B2  
APPLICATION NO. : 14/203023  
DATED : October 4, 2016  
INVENTOR(S) : Christopher J. Obaditch et al.

Page 1 of 1

It is certified that error appears in the above-identified patent and that said Letters Patent is hereby corrected as shown below:

On the Title Page

Assignee "Fluor Corporation" should be "Fluor Technologies Corporation"

In the Specification

Column 11, Line 17 - "the first anvil, the second anvil." should be "the first anvil, and the second anvil."

Signed and Sealed this  
First Day of August, 2017

Joseph Matal  
*Performing the Functions and Duties of the*  
*Under Secretary of Commerce for Intellectual Property and*  
*Director of the United States Patent and Trademark Office*